United States Patent

Termin et al.

[15] 3,699,137
[45] Oct. 17, 1972

[54] PRODUCTION OF POTASSIUM TITANYL OXALATE

[72] Inventors: Erich Termin, Laufenburg; Otto Bleh, Bergheim, both of Germany

[73] Assignee: Dynamit Nobel Aktiengesellschaft, Postfach, Germany

[22] Filed: Dec. 8, 1970

[21] Appl. No.: 96,242

[30] Foreign Application Priority Data

Dec. 13, 1969    Germany..........P 19 62 641.6

[52] U.S. Cl. ...............................................260/429.5
[51] Int. Cl. ................................................C07f 7/28
[58] Field of Search..................................260/429.5

[56] References Cited

UNITED STATES PATENTS

| | | |
|---|---|---|
| 760,319 | 5/1904 | Dreher ...................260/429.5 |
| 1,255,807 | 2/1918 | Spencer et al. .........260/429.5 |
| 2,027,812 | 1/1936 | Crundall..................260/429.5 |
| 2,758,911 | 8/1956 | Lynd et al...........260/429.5 X |
| 3,090,728 | 5/1963 | Berger et al. .......260/429.5 X |
| 3,091,526 | 5/1963 | Fowler et al........260/429.5 X |
| 3,321,444 | 5/1967 | Hoyer et al. ........260/429.5 X |

OTHER PUBLICATIONS

Chemical Abstracts, Vol. 53, 17745de(1959).
Feld et al., The Org. Chem. of Titanium, Butterworths & Co., Wash. D.C., pp. 25 to 31 (1965).
Chemical Abstracts, Vol. 56, 3105e (1962).
Zt. Anorg. Chem., Vol. 26, pp. 252- 253 (1901).
Chemical Abstracts, Vol. 55, 8787d (1961).
Chemiker–Zeitung Vol. 75, pp. 754– 755 (1933).
Chemical Abstracts, Vol. 47, 7433 (1953).

*Primary Examiner*—Tobias E. Levow
*Assistant Examiner*—H. M. S. Sneed
*Attorney*—Burgess, Dinklage & Sprung

[57] ABSTRACT

Process for the production of potassium titanyl oxalate which comprises heating a tetraalkyl titanate with about three times the molar amount of water and twice the molar amount of potassium hydrogen oxalate. If desired, two thirds of the water is added initially and the balance subsequently. A solvent such as an alkanol may be employed. Advantageously the reaction, distillation of volatiles, crystallization and drying are all performed in the same vessel.

7 Claims, No Drawings

PRODUCTION OF POTASSIUM TITANYL OXALATE

The invention relates to a special process for the manufacture of potassium titanyl oxalate from tetraalkyl-titanates, potassium hydrogen oxalate and water.

Potassium titanyl oxalate is known as a crystalline salt which crystallizes with 2 moles of water of crystallization. It corresponds to the formula $K_2TiO(C_2O_4)_2 \cdot 2 H_2O$ and has the structural formula

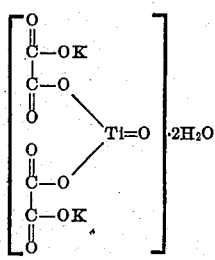

Potassium titanyl oxalate has many applications. For example, it can be used for extinguishing hydrocarbon fires, for the fireproofing of fibers, as a catalyst for the polymerization of $\alpha$-olefins, as a fixing agent for dyes, as a yellow toner in leather drenching, and in many other applications.

Two processes have become known for the manufacture of potassium titanyl oxalate. A concentrated solution of potassium hydrogen oxalate, saturated at the boiling temperature with freshly precipitated titanic acid, yields, after concentration by evaporation, white crystals which can be rendered analytically pure only by repeated recrystallization from water (Zt. anorg. Chem. 26, (1901) 252–253). This procedure results in inadequate yields of only about 50 percent, since the freshly prepared $TiO_2$ does not react quantitatively with potassium hydrogen oxalate. Another disadvantage of the process is that either a great amount of crystallization work has to be accepted or the product has to be precipitated from the solution with alcohol.

In another prior-art process, $TiO_2$ can be fused with KOH at 550°–600°C. to form $K_2TiO_3$. This is neutralized with concentrated oxalic acid solution and filtered, and the product is precipitated from the filtrate (Chemiker-Zeitung 75 (1933), 754–755). This, however, is a very expensive process, because after the neutralization with oxalic acid a colloidal suspension of unreacted material develops which can be separated by filtration only after standing for about 24 hours. In this process, too, the yield is only 50 percent of the $TiO_2$ input.

It has now been found that potassium titanyl oxalate can be prepared in a simple manner and in a virtually quantitative yield by first adding approximately 2 moles of water and about 2 moles of potassium hydrogen oxalate to each mole of tetraalkyltitanate and heating the mixture to ebullition, and then adding about 1 mole more of water per mole of tetraalkyltitanate, or by adding to each mole of a tetraalkyltitanate about 2 moles of potassium hydrogen oxalate and heating to ebullition and simultaneously or thereafter adding at least 3 moles of water and heating the mixture to ebullition, and in either case isolating the reaction product from the slurry-like phase after the concentration of the latter, and then drying if desired.

One particularly advantageous embodiment involves the use of a solvent as a medium for the reaction. The function of the solvent is threefold. First it acts as a solubilizer for the solid starting material, secondly as an aid in achieving the desired partial hydrolysis since the dilution avoids the danger of localized total hydrolysis, and thirdly as a medium for the crystallization wherein it takes up impurities or excess reaction components, facilitates filtration in some cases, and permits separations by forming binary phases.

All solvents are suitable for this purpose which are inert or quasi-inert under the conditions of the reaction. The alcohols are especially preferred as solvents. It is also advantageous for purification reasons to use preferably those alcohols whose alkyl radicals are the same as the alkyl radical of the tetraalkyltitanates.

Especially preferred for the performance of the process are the tetraalkyltitanates of the $C_1$ to $C_4$ alcohols, such as tetramethyltitanate, tetraethyltitanate, tetra-n-propyltitanate, tetra-i-propyltitanate, tetra-n-butyltitanate, tetra-i-butyltitanate, and the like, as well as mixtures thereof.

The process is extremely simple to perform, i.e., if the reaction is performed, for example, in a reaction vessel equipped with a wall-following stirrer, the reaction, the concentration of the liquid phase, and the drying of the product can all be carried out in the same vessel.

To carry out the process, the starting materials are put into the vessel in the stated order and quantity ratios, and the reaction is carried out as described. The reaction product precipitates, after the completion of the reaction and the concentration of the liquid phase, in the form of a solid, colorless substance. In a special embodiment of the process of the present invention, the reaction of the tetraalkyltitanate (1 mole) with the potassium hydrogen oxalate (2 moles) is first performed and the product is isolated, and then the product is subjected to hydrolysis by the addition of at least about 3 moles of water, whereupon two liquid phases form. From the bottom phase the product can be isolated in crystal form in the manner described. In another embodiment, the potassium hydrogen oxalate is produced by the reaction of 1 mole of potassium hydroxide per mole of oxalic acid prior to the performance of the process of the invention.

In this case the use of solvents in the reaction is necessary. In this embodiment, however, the purity of the final product is lower, since the hydrolysis operates in the desired manner to a lesser extent.

The raw product is subjected to the gentlest possible drying action wherein the temperature should not exceed 110°C. Preferably the drying is performed at a temperature that is sufficient for the removal of the alcohol freed by the hydrolysis. It is advantageous to perform the drying under a water-jet vacuum.

Quantitative yields are obtained if one adheres as closely as possible to the stoichiometric ratios, e.g., +5 percent of stoichiometric potassium hydrogen oxalate.

Deviations from these ratios result in reduced yields of low grades of purity. If the conditions described are maintained the product has a high degree of purity.

The process of the invention will be further described in the following illustrative examples:

EXAMPLE 1

427 g of tetra-i-propyltitanate was heated for 1 hour at ebullition with 200 g of isopropanol and 391 g of potassium hydrogen oxalate. The alcohol was removed by evaporation. Then the remainder was heated at ebullition with 242 g of water. 2 liquid layers formed. The lower layer was separated. The desired product immediately crystallized out from the lower layer and was dried at 70°C in a water-jet vacuum. The yield was 95 percent with reference to the tetraalkyltitanate. The product was crystalline and of high purity.

EXAMPLE 2

In a reaction vessel equipped with a wall-following stirrer, 384 g of potassium hydrogen oxalate was heated at ebullition with 342 g of tetraethyltitanate for 1 hour, with refluxing and stirring. Then 81 g of water was added, heating at ebullition was continued for another hour, and the vessel was set for distillation. Finally the drying was performed in the same vessel at 100°C bath temperature under a water-jet vacuum. 535 g of product of good purity was obtained.

EXAMPLE 3

In a reaction vessel equipped with a wall-following stirrer, 283.3 g of tetra-i-propyltitanate was hydrolyzed at the boiling temperature while an aqueous solution of isopropanol (16 g of water in 200 ml isopropanol) was added drop by drop.

Then 256.2 g of potassium hydrogen oxalate was added, followed by 18 g of water, and the mixture was evaporated dry. A product of technical purity was obtained in a quantitative yield.

EXAMPLE 4

In a stirring vessel equipped with a wall-following stirrer, 127.4 g of 88 wt-% aqueous KOH (2 moles) was dissolved in isopropanol and 180 g (2 moles) of anhydrous oxalic acid was added with cooling. After 1 hour of heating, 284 g (1 mole) of tetra-i-propyltitanate was added rapidly drop by drop and the mixture was heated for another hour at ebullition with reflux distillation. Then the isopropyl alcohol was distilled off and the product was dried in a vacuum at 60°C. A product of technical purity was obtained in a 95 percent yield. During this reaction no water had to be added, since the water in the raw materials (15.2 g in the KOH, 2.1 g in the oxalic acid = approximately 1 mole) and the water formed in the intermediate reaction (2 moles) was stoichiometrically sufficient for the hydrolysis. The alcohol removed in the distillation was pure and could be reused.

It will be appreciated that the instant specification and examples are set forth by way of illustration and not limitation, and that various modifications and changes may be made without departing from the spirit and scope of the present invention.

What is claimed is:

1. Process for the production of potassium titanyl oxalate which comprises heating a tetraalkyl titanate with about 3 times the molar amount of water and twice the molar amount of potassium hydrogen oxalate.

2. Process according to claim 1, wherein the tetraalkyl titanate, the potassium hydrogen oxalate and about two-thirds of the water are boiled, and then the balance of the water is added.

3. Process according to claim 1, wherein the reaction mass is subjected to distillation to remove all volatiles and leave a crystalline product of high purity.

4. Process according to claim 1, wherein the process is effected in a solvent.

5. Process according to claim 4, wherein the solvent is an alcohol.

6. Process according to claim 5, wherein the alcohol is an alkanol of one to four carbon atoms whose alkyl radical is the same as that of the tetraalkyl titanate.

7. Process according to claim 6, wherein the reaction mass is subjected to distillation to remove all volatiles and leave a crystalline product of high purity.

* * * * *